No. 692,640. Patented Feb. 4, 1902.
S. DRURY.
SLICING MACHINE.
(Application filed May 25, 1900.)
(No Model.) 2 Sheets—Sheet 1.
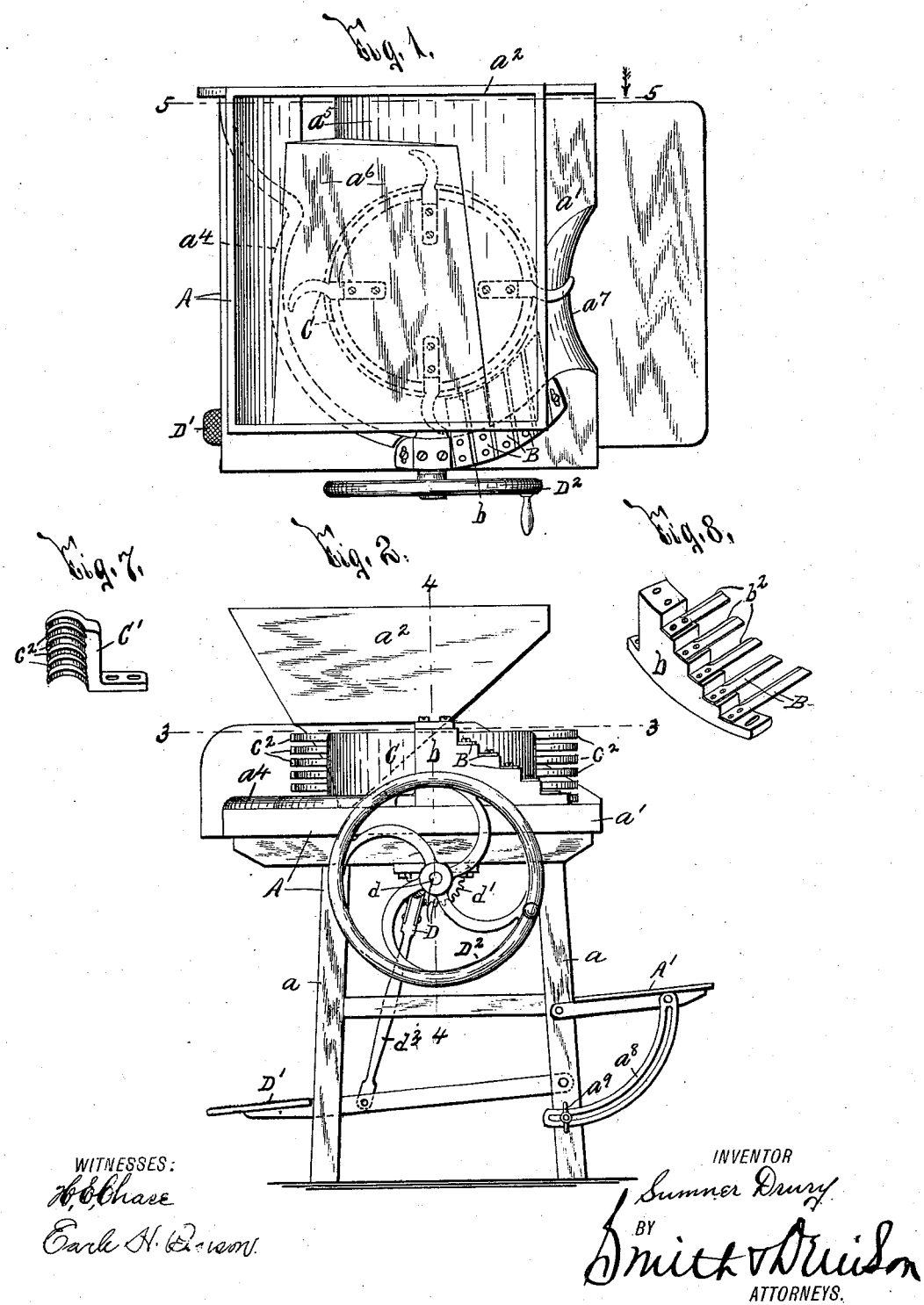

No. 692,640.

Patented Feb. 4, 1902.

S. DRURY.

SLICING MACHINE.

(Application filed May 25, 1900.)

(No Model.)

2 Sheets—Sheet 2.

UNITED STATES PATENT OFFICE.

SUMNER DRURY, OF WOLCOTT, NEW YORK.

SLICING-MACHINE.

SPECIFICATION forming part of Letters Patent No. 692,640, dated February 4, 1902.

Application filed May 25, 1900. Serial No. 17,952. (No model.)

*To all whom it may concern:*

Be it known that I, SUMNER DRURY, of Wolcott, in the county of Wayne, in the State of New York, have invented new and useful Improvements in Slicing-Machines, of which the following, taken in connection with the accompanying drawings, is a full, clear, and exact description.

This invention relates to improvements in slicing-machines for slicing apples and similar fruit or vegetables, its object being the production of a simple and practical device which will speedily and automatically feed, cut, and discharge the apples or other fruit without mutilation or undue injury thereto.

To this end the invention consists in the combination, construction, and arrangement of the component parts of a slicing-machine, as hereinafter fully described, and pointed out in the claim.

In describing this invention reference is had to the accompanying drawings, forming a part of this specification, in which like letters indicate corresponding parts in all the views.

Figures 1 and 2 are respectively top plan and side elevations of my improved slicing-machine. Figs. 3, 4, and 5 are sectional views taken, respectively, on lines 3 3, 4 4, Fig. 2, and 5 5, Fig. 1. Fig. 6 is an isometric view of the detached carrier, the engaging arms being removed. Figs. 7 and 8 are isometric views, respectively, of one of the detached engaging arms and the support for the knives or cutters, the knives or cutters being shown in Fig. 8 as operatively secured to the support.

It is well known to those skilled in this art that considerable difficulty is experienced in machines of this character in preserving the integrity of the slices when passing through the cutters and that frequently considerable of the juices and nourishment of the fruit is extracted and lost during the operation of cutting same. In order to obviate these objectionable results, I preferably arrange the knives or cutters in planes one above the other, with their cutting edges disposed one in advance of the other in the direction of the movement of the adjacent portions of the carrier. I also provide the carrier with a plurality of engaging arms having a series of separated fingers movably between the cutters in order to produce a shearing effect in combination with the cutters. This arrangement of the cutters and engaging arms reduces to a minimum the compression of the fruit and affords a rigid support for each slice when passing through the cutters.

As shown in the drawings, this invention consists of a frame A, knives or cutters B, a rotary carrier C, and suitable driving mechanism D for rotating the carrier. The frame A may be of any desired construction, and preferably consists of upright standards $a$, a substantially horizontal supporting-bed $a'$, mounted on the standards $a$, and a hopper $a^2$, arranged above the bed $a'$ and preferably supported thereby. The bed $a'$ is usually formed with a substantially central opening $a^3$, extending through its upper and lower faces for receiving a portion of the carrier C, previously mentioned, and is also provided with an upwardly-projecting rib $a^4$, which surrounds a portion of the carrier for retaining the apples or other fruit in the path of the engaging arms during the movement of the carrier. The hopper $a^2$ is preferably supported above the carrier C and is provided with a chute $a^5$, leading from the bottom wall $a^6$ of the hopper to the bed $a'$ for conducting the apples or other fruit from the hopper to the bed. The chute $a^5$ is arranged at one end of the hopper $a^2$ and extends downwardly at one side of the carrier C. The bottom wall $a^6$ inclines upwardly from the chute $a^5$ for permitting the apples or other fruit to feed by gravity to the chute. The front edge of the bed $a'$ is preferably provided with a suitable cut-out $a^7$, extending toward the carrier C, for permitting the sliced fruit to readily fall by gravity into a receptacle (not illustrated) supported upon a shelf A', which is secured to the frame A. The shelf A' is preferably hinged to the adjacent portion of the frame and is provided with arms $a^8$, adjustably secured to the frame A by suitable clamping-screws $a^9$.

The knives or cutters B are preferably formed of non-corrosive metal, are disposed in planes one above the other, and their cutting edges are usually arranged one in advance of the other in the direction of movement of the adjacent portion of the carrier. The knives or cutters may be supported in any desired manner and are preferably mounted upon a suitable support $b$, provided with steps $b'$, to which are secured the adjacent ends of the knives or cutters B. The opposite ends of the knives or cutters extend beyond the inner face of the support toward the carrier C and are provided with rear cutting edges $b^2$. The support for the knives or cutters is usually adjustably secured to the upper face of the bed $a'$ by suitable fastening means, as screws $b^3$, in order that the knives or cutters may be properly adjusted toward and away from the carrier C.

The carrier C may be of any desired form or construction and preferably consists of a rotary frame having an upwardly-extending annular flange $c$ and a plurality of engaging arms $C'$, extending outwardly beyond the annular flange $c$. The flange $c$ is provided with a plurality of substantially radial cut-outs $c'$ for receiving the engaging arms $C'$, said engaging arms being detachably secured to the bottom wall of the carrier C by suitable screws $c^3$. The engaging arms $C'$ are formed of substantially the same width as the cut-outs $c'$ and are additionally held from displacement by the opposite walls of said cut-outs $c'$. The front face of the outwardly-projecting ends of the engaging arms $C'$ are usually curved and are provided with a series of fingers $c^2$, arranged one above the other in horizontal alinement with the spaces between the knives or cutters B.

The described construction and relation of the fingers $c^2$ of the engaging arms and the knives or cutters B are particularly advantageous, since a shearing effect is produced by the passage of the fingers between the knives or cutters B, which reduces to a minimum the compression of the fruit impinged between the knives or cutters and the fingers during the rotary movement of the carrier. The carrier C may be rotated in any desired manner, is preferably provided with a circular rack $c^4$, secured to its lower face, and is usually mounted on a substantially perpendicular shaft $c^5$, journaled at its opposite ends on the frame A.

The driving mechanism D preferably consists of a shaft $d$, journaled on the frame A and provided with a pinion $d'$, meshing with the circular rack $c^4$. The shaft $d$ may be actuated by any desired means and is here illustrated as provided with a crank-arm $d^2$ and balance-wheel $D^2$. A suitable foot-treadle $D'$ is here illustrated as connected to the crank-arm $d^2$ by a pitman $d^3$. It is thus apparent that the shaft $d$ may be driven by the foot-treadle $D'$; but when desired to operate by hand the balance-wheel $D^2$ is provided with a suitable handle $d^4$.

In the operation of my invention the apples or other fruit are placed in the hopper $a^2$ and feed by gravity through the chute $a^3$ to the bed $a'$, whereupon the engaging arms $C'$ engage the apples or other fruit and force the same into engagement with the knives or cutters B, by which the apples or other fruit are speedily and evenly sliced and are automatically discharged from the bed A to the receptacle (not illustrated) supported upon the shelf $A'$.

The operation of my invention will now be readily understood by reference to the foregoing description and the accompanying drawings, and it will be understood that considerable change may be made in the detail construction and arrangement of the parts of my improved slicing-machine without departing from the spirit of my invention. Therefore I do not limit myself to the precise construction and arrangement herein shown and described.

Having thus fully described my invention, what I claim as new, and desire to secure by Letters Patent, is—

The improved slicing-machine herein described and shown consisting of a table having a central opening, a curved retaining-rib on the upper side of the table concentric with said opening and having one end turned off therefrom, a hopper supported above the table, a chute leading from the hopper to a point near the offturned end of the retaining-rib, a radially-adjustable curved support secured on the table adjacent to the opposite end of the rib, and having a stepped upper side, a series of knives secured rigidly on the upper side of the said support and projecting toward the central opening of the table, a rotary carrier mounted in said central opening, means for rotating said carrier, and a series of radial arms secured to and projecting from the carrier and adapted to coact with the knives.

In witness whereof I have hereunto set my hand this 3d day of April, 1900.

SUMNER DRURY.

Witnesses:
 JOEL FANNING,
 E. H. KELLOGG.